(12) United States Patent
O'Dell et al.

(10) Patent No.: US 10,955,861 B2
(45) Date of Patent: Mar. 23, 2021

(54) ELECTRONIC CIRCUIT FOR FLUID FLOW MEASUREMENT AND CONTROL

(71) Applicant: HOT SOCKET, LLC, Los Altos, CA (US)

(72) Inventors: Thomas Anthony O'Dell, Sunnyvale, CA (US); Paul Christopher Dorsey, Los Altos, CA (US)

(73) Assignee: HOT SOCKET, LLC, Los Altos, CA (US)

( * ) Notice: Subject to any disclaimer, the term of this patent is extended or adjusted under 35 U.S.C. 154(b) by 214 days.

(21) Appl. No.: 15/925,457

(22) Filed: Mar. 19, 2018

(65) Prior Publication Data

US 2019/0286172 A1  Sep. 19, 2019

(51) Int. Cl.
*G05D 7/06* (2006.01)
*G01F 1/58* (2006.01)
*A01G 25/16* (2006.01)

(52) U.S. Cl.
CPC ........... *G05D 7/0635* (2013.01); *G01F 1/586* (2013.01); *A01G 25/16* (2013.01)

(58) Field of Classification Search
USPC ....................... 324/239, 453, 654; 137/2, 436
See application file for complete search history.

(56) References Cited

U.S. PATENT DOCUMENTS 5,086,806 A * 2/1992 Engler .................. G01F 15/003
                                                            137/486
2010/0294021 A1* 11/2010 Makino .................. G01N 25/18
                                                             73/25.03

* cited by examiner

*Primary Examiner* — Vincent Q Nguyen

(57) ABSTRACT

A circuit that can be used to add a flow meter to an existing set of wires that connects a controller to an electric valve. The circuit does not require the need to run additional wiring from the controller to the valve and flow meter. The circuit creates pulses of current with a rate that is proportional to the flow, which are then transmitted to a receiver and converted to a flow measurement output to the user by a controller.

17 Claims, 3 Drawing Sheets

ELECTRONIC CIRCUIT FOR FLUID FLOW MEASUREMENT AND CONTROL

TECHNICAL FIELD

The present disclosure involves the art of electrical circuit design as applied to the field of fluid measurement and control systems and refers to a circuit architecture that allows an electrical solenoid valve and a flow sensor to work simultaneously with only two connecting wires.

BACKGROUND

An automated system for distributing fluid from a source to multiple areas of use is used for many applications, and is hereinafter referred to as a fluid control system. One example of such a fluid control system is an irrigation system whose purpose is to distribute water to growing plants, and is hereinafter referred to as an irrigation system. The basic irrigation system known in the art uses a set of wires that run from a controller to a set of remote electrical valves. The irrigation system has the ability to automatically switch the water flow from a source to a use area, either on or off. The valves will open and allow water to flow to the use area when power is delivered to the valve by the controller. A typical valve has two wires that allow electrical power to be applied to the device. There is an individual wire that runs from the controller to each valve and allows each valve to be controlled independently. The second wire of each valve is connected in common and is then connected as one connection at the controller. Therefore the numbers of wires required in such a system between the controller and valves is the number of independent valves plus one. A large majority of the installed fluid control systems use this wiring configuration.

For systems that do not include flow meters, a manual observation is required to detect problems with the system. The problems can be related to the valves, the water release mechanisms such as sprinkler heads, and pipe failures. Depending on the frequency of the manual observation there can be a substantial time delay between the system failure and detection. In the case of a pipe failure, the delay can be costly due the loss of water by the system. In the case of a valve failure to open, the delay can be costly due to the loss of plant growth potential. Therefore, without flow meters, the management of system failures must be a compromise between the cost of the manual observation and the losses incurred due to system failure. This compromise can be avoided and the overall system management efficiency increased if flow meters are added to the system.

A primary deterrent for installing wired flow meters in an existing irrigation system is the need to install additional wiring between the control system and the flow meters as required by prior art.

SUMMARY

Embodiments of the present disclosure avoid this primary deterrent by teaching techniques of installing flow meters with a circuit that does not require additional wiring. With embodiments of the present disclosure the addition of flow meters for fluid control systems can be achieved cost effectively to provide enhanced system management.

Embodiments of the present disclosure provide a circuit that can be used for detecting a fluid flow based on a rate of pulses and transmitting that pulse information to a controller system over a pair of wires shared with a solenoid valve. Embodiments include two parts, a unit installed as part of a flow meter, and a unit installed as part of the fluid controller. The unit installed as part of the flow meter will hereafter will be called the flow pulse transmitter. The unit installed as part of the controller will hereafter be called the flow pulse receiver with solenoid driver. The design of these two units, the flow pulse transmitter and the flow pulse receiver with solenoid driver, allows simple pulse information to be transmitted over a pair of wires shared with one or more solenoid valves and constitutes embodiments of the present disclosure. Another feature of embodiments of the present disclosure is that it allows the transmission of the pulse information from the flow meter to the controller with the solenoid valve both in the open state and in the closed state.

Embodiments of the present disclosure teach a circuit architecture that can be used to create the necessary functions for integrating a flow meter to an existing solenoid value, which is unlike the US patent US20120325016 A1 by inventor Ori Peled. The US patent US20120325016 A1 does not teach circuit architecture.

A more complete understanding of embodiments of the present disclosure will be obtained from the following detailed description when taken in connection with the attached drawings.

DETAILED DESCRIPTION

Figure 1:
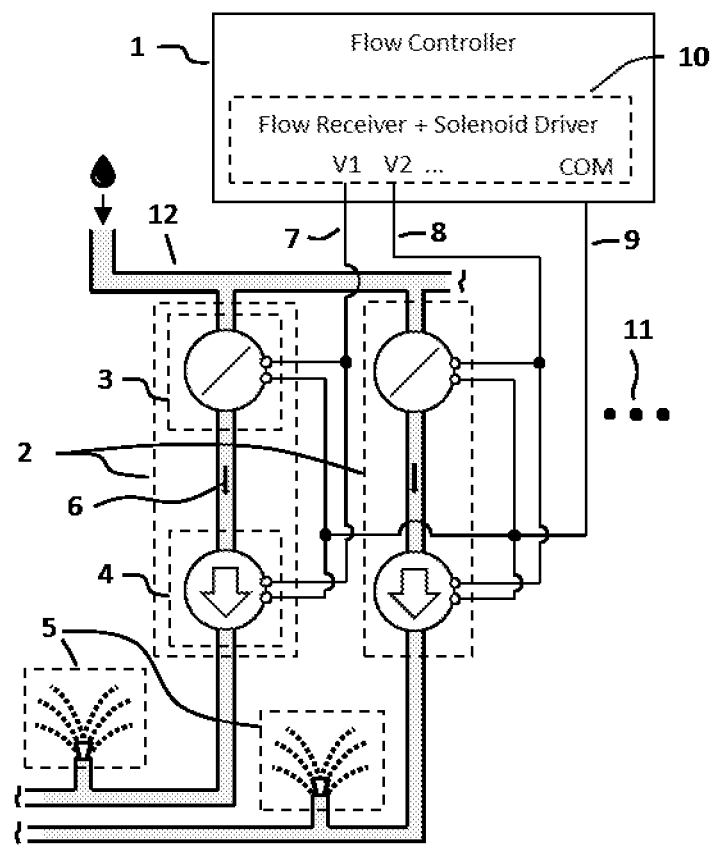
FIG. 1 shows an example of a fluid control system using N+1 wires to control N electrical valves and N flow meters.

FIG. 1 is a diagram of a fluid control system utilizing N+1 wires to connect a fluid controller 1 with N electrical valves and flow meter units 2. FIG. 1 depicts two electrical valve and flow meter units 2 feed from an input manifold 12 with three wire connections 7, 8, and 9. However the expansion to a greater number of electrical valve and flow meter units of is implied by the ellipsis symbol 11. Each said electrical valve and flow meter unit 2, is shown having no more than two electrical wire connections. The electrical valve unit 3 of each electrical valve and flow meter unit 2 is electrically activated by the controller to control the flow of water from its inlet to its outlet. The flow meter 4 of each electrical valve and flow meter unit 2, is coupled to the outlet of the said valve 3, such that it can sense the flow of fluid 6 from said value 3. The state of the fluid flow 6 is transmitted to the controller 1 using the same wires that connect to the said electrical valve 3. In the preferred embodiment the fluid outlet of each electrical valve and flow meter 2 is connected to one or more water release mechanisms 5 as depicted in FIG. 1, however other uses for the fluid flow are possible. The circuit design for the electrical valve and flow sensor unit 2 and the flow pulse receiver and solenoid driver 10 portion of the said fluid controller 1, constitute elements of embodiments of the present disclosure.

Figure 2:
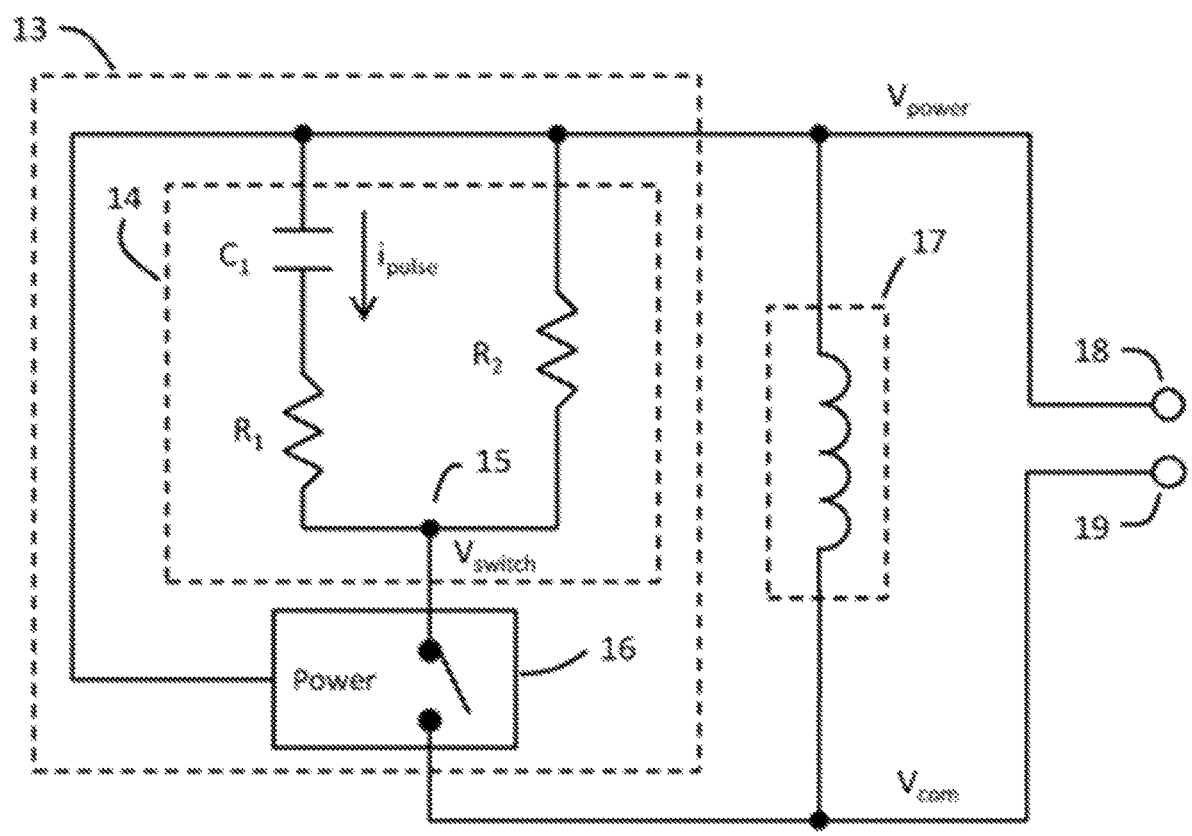
FIG. 2 is a circuit diagram of a combined solenoid valve and flow meter with pulse transmitter.

FIG. 2 is a circuit diagram of a combined solenoid valve and flow meter with pulse transmitter. The FIG. 2 circuit diagram represents the detailed embodiment of the design for the electrical valve and flow meter unit 2 in FIG. 1. Referring to FIG. 2, the power connection, Vpower, to the circuit is made with terminal 18 and the common connection, Vcom, to the circuit is made with terminal 19. The power terminal 18 is driven from a low impedance voltage source. The inductor 17, represents the prime mover for the fluid flow valve, such that fluid flow is initiated through the valve when enough electrical power is applied to open the value and fluid flow is maintained when enough electrical power is applied to maintain the valve in the open state. The inductor 17, is connected between the Vpower and Vcom nodes. The flow detector and pulse transmitter 13 portion of the circuit is itself comprised of two parts, a first part is the flow pulse switch 16, and a second part is the current pulse generator 14.

The purpose of the flow pulse switch 16, is to create a switching function that cycles a high and low impedance between its switching terminal 15 and Vcom. The flow pulse switch is configured to create a cycle rate that is proportional to flow. In an embodiment of the present disclosure, the flow pulse switch is a Hall sensor IC that detects the rotation of an impeller shaft imposed in the fluid flow. The impeller shaft has an attached permanent magnet that is sensed by the Hall sensor IC and switches the impedance between its switching terminal 15 and Vcom based on magnet orientation. One possible embodiment uses a Hall sensor IC with part number WHS130 manufactured by Winson, although other devices are possible.

The purpose of the current pulse generator 14 is to create a pulse of electrical current to flow between the Vpower and Vcom nodes each time the flow pulse switch changes from a high impedance to a low impedance state. The current pulse generator is comprised of a capacitor C1 in series with a resistor R1 and this combination is in parallel with resistor R2. The purpose of the series capacitor C1 and resistor R1 is to create an initial low impedance path for electrical current to flow when the flow pulse switch 16, switches to low impedance. The result is a rapid increase of current to be generated between the Vpower and Vcom nodes. The resulting current pulse is limited in energy by the resistive and capacitive time constant formed by the series combination of capacitor C1 and resistor R1. This energy limiting is important for protecting the flow pulse switch device 16 from exceeding its thermal limit and becoming damaged. The peak current that will flow through the flow pulse switch 16 is:

$$i_{pulse} = V_{power} - V_{switch}/R_2 \quad (1)$$

In equation (1), Vswitch is the voltage that the flow pulse switch will generate when it is in its low impedance state. The maximum energy dissipation in the flow pulse switch device will be:

$$E = 2.2 * i_{pulse} * V_{switch} * R_1 * C_1 \quad (2).$$

The purpose of resistor R2 is to allow a discharge path for capacitor C1. In one possible embodiment of the present disclosure, the capacitor C1 has a value of 1.0 micro farad, the resistor R1 has a value of 50.0 Ohms, and resistor R2 has a value of 2200 ohms, and Vpower has a value of 5.0 Volts and the maximum pulse current through capacitor C1 is 100 milliamps. However, other values are possible that meet the requirements for limiting the total pulse energy within the tolerances of the flow pulse switch damage limits and achieving a high enough peak current to be detected by the flow pulse receiver, which will be described next.

Figure 3:
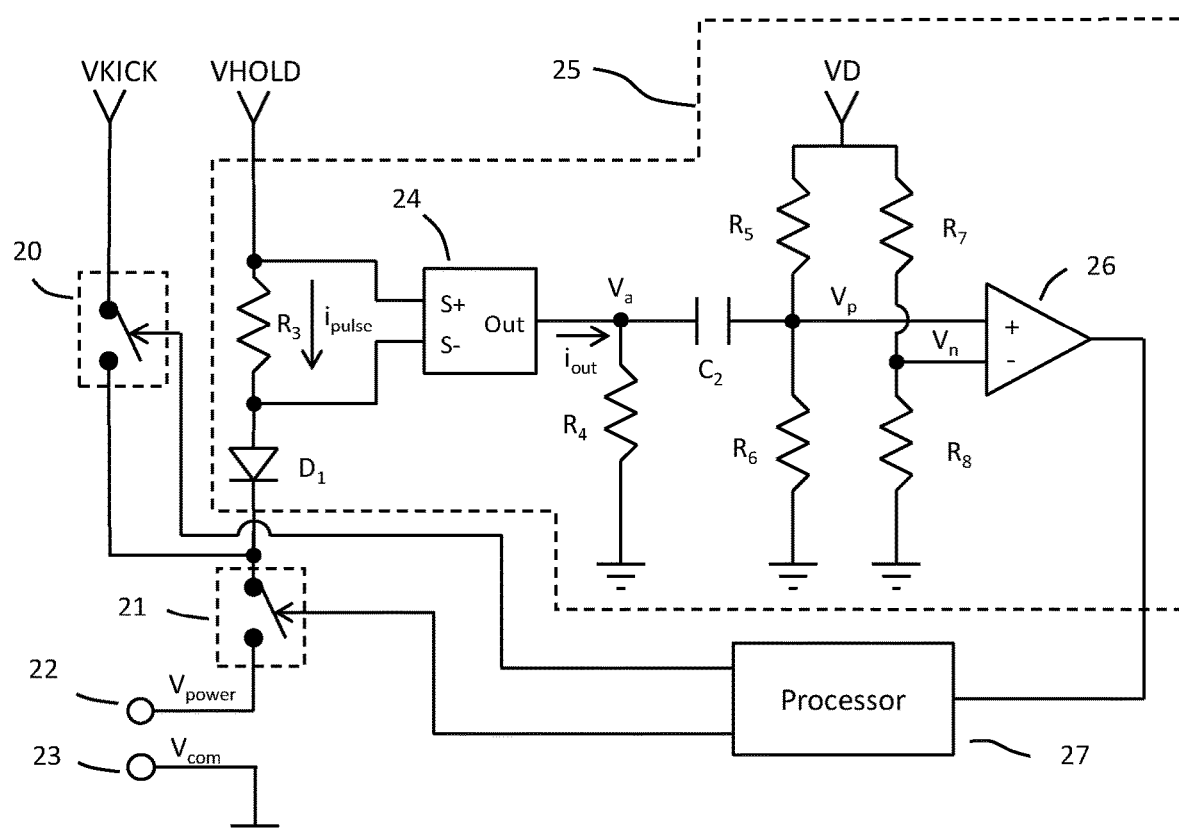
FIG. 3 is a circuit diagram of a flow pulse receiver and solenoid driver.

FIG. 3 is a circuit diagram for a flow pulse receiver and solenoid driver and represents the preferred detailed embodiment of the corresponding flow pulse receiver and solenoid driver 10 depicted in FIG. 1. Referring to FIG. 3, the power terminal, Vpower 22 and common terminal, Vcom 23 are connected to the like terminals of the solenoid valve and flow meter with pulse transmitter circuit from FIG. 2. Referring to FIG. 3. the labeled terminals VKICK, VHOLD, and VD represent low impedance voltage sources.

Referring to FIG. 3, the receiver portion of the circuit 25 is constructed as a high side current sense circuit that is AC coupled to a voltage comparator IC 26. The resistor R3 creates a small differential voltage across its terminals according to Ohm's law due to the current flowing from the VHOLD voltage source to Vcom when the switch 21 is closed. The small differential voltage across R3 is amplified and converted to an output current by a high side current sense integrated circuit 24. In one possible embodiment, the high side current sense device 24 is part number ZXCT1009 manufactured by Diodes Incorporated. The high side current sense device 24 outputs a current, iout, proportional to the current flow through resistor R3. Therefore the voltage at node Va is equal to the output current, iout, multiplied by node Va impedance to node Vcom. In one embodiment that uses the ZXCT1009 as device 24, the voltage at node Va is a function of the current ipulse flowing though resistor R3, given by:

$$V_a \approx 0.01 * i_{pulse} * R_3 * R_4 \quad (3)$$

Equation 3 is approximately correct when the impedance for current flow through C2 is much greater than through R4. In one embodiment of the present disclosure, the value of resistor R3 can be 0.5 Ohm and resistor R4 can be 2000 Ohm, although other component values are possible.

Node Vn is steady state biased by the voltage divider created by resistor pair R7 and R8 to a value that is within the input operation range of the voltage comparator integrated circuit 26. In one embodiment, the voltage comparator integrated circuit 26 can be the part number TS391 manufactured by Texas Instruments Incorporated, although other devices are possible. In an embodiment, the voltage source VD can be 3.30 volts, the resistor R7 value can be 10,000 Ohm and the resistor R8 value can be 1780 Ohm, which will generate a steady state voltage at node Vn of 0.499 volts, although other values are possible.

The voltage at node Vp is steady state biased by the voltage divider created by resistor pair R5 and R6 to a value that is slightly lower than node Vn and is connected to the non-inverting input of voltage comparator 26. The capacitor C2 blocks the steady state voltage at node Va and only allows rapid changes in the voltage at node Va to influence the voltage at node Vp. Changes in the voltage at node Va will be imposed on node Vp only when they occur within a time period approximately shorter than the time constant T, formed by capacitor C2 and the parallel combination of resistors R5 and R6, and is given by:

$$T = 2.2 * C_2 * \left(\frac{R_5 * R_6}{R_5 + R_6}\right) \quad (4)$$

In an embodiment, the capacitor C2 value can be 0.1 microfarad and the resistor R5 value can be 10,000 Ohm and the resistor R6 value can be 1,580 Ohm, although other values are possible. With the embodiment just specified and the voltage source VD having a possible value of 3.30 volts the bias voltage at node Vp will be 0.450 volts. With the preferred embodiment just specified the time T will be 0.0003 seconds. With the preferred embodiment just specified the differential voltage between node Vp and Vn is 50 millivolts and using equation 1 is equivalent to current of 5 milliamps. Therefore in the preferred embodiment specified if the current in resistor R3 changes by more than 5 milliamps in a time period smaller than 0.0003 seconds, it will cause the output of voltage comparator 26 to change state. The state of comparator 26 output is monitored by processor 27. Processor 27 is able to measure the time between state transitions of comparator 27 and is therefore able to calculate a flow rate.

It is well known in the art that the power required for a solenoid to pull in its plunger is much greater than the power required to hold it in. This solenoid operation characteristic is uniquely exploited in the context of embodiments of the present disclosure to allow the flow meter to operate with the solenoid valve both in the open and closed states. The control of the solenoid valve is accomplished by changing the state of switch 20 and switch 21. To turn on the solenoid valve, switch 21 is closed and then switch 20 is momentary closed and then opened. The momentary closing of switch 20 causes enough power to be delivered to the solenoid such that its magnetic field is strong enough to pull in the plunger which opens the valve. The voltage impressed on the solenoid by closing switch 21 is not enough to cause the value to open however it is enough to keep the solenoid plunger retracted and the valve in the open state. In addition, the voltage applied to the solenoid and flow meter by closing switch 21 is enough to operate the flow meter with pulse transmitter, therefore the flow meter is operational with the valve in the open state. To turn off the solenoid valve the switch 21 is opened and the solenoid plunger is pushed out, typically by a spring force to close the valve. If switch 21 is closed without closing switch 20, it is possible operate the flow meter with the valve in the off state. A necessary condition for this feature is that the voltage impressed on the solenoid by closing switch 21 is not enough to enough to open the valve, but is enough to operate the flow meter. This unique capability allows a leak or failure of the valve system to be detected when the valve is in the closed state. In one embodiment the voltage applied to open the valve can be 12 volts and the voltage applied to hold and operate the flow meter can be 5 volts. The placement of the diode D1 in the current flow path from VHOLD to Vcom is required to prevent the voltage supplied by VKICK from driving into the voltage source that supplies VHOLD.

The invention claimed is:

1. An electronic circuit for a fluid control system, comprising: a flow detector and pulse transmitter configured to be coupled to a valve and a flow meter and including a first power node and a first reference node, the flow detector and pulse transmitter further configured to generate current pulses on the first power node at a rate indicating a fluid flow sensed by the flow meter; ad a controller including a second power node and a second reference node configured to be coupled to the first power node and first reference node of the flow detector and pulse transmitter, respectively, the controller configured to detect the current pulses generated by the flow detector and pulse transmitter on the first power node and to calculate the fluid flow sensed by the flow meter based on the rate of the current pulses, and the controller further configured to provide power on the second power node to control the valve and to power the flow detector and pulse transmitter; wherein the valve comprises a solenoid valve including an inductor, and wherein the controller includes a first switch and a second switch coupled to control energizing and de-energizing of the inductor of the solenoid valve; and wherein the controller allows sensing of fluid flow by the flow meter with the solenoid valve in both an open state and a closed state, the controller configured to control the first and second switches to supply a first level of power on the second power node to drive the solenoid valve to the open state, and to thereafter control the first and second switches to supply a second level of power on the second power node, where the second level of power is sufficient to power the flow detector and pulse transmitter and to maintain the solenoid valve in the open state but is not sufficient to switch the solenoid valve from the closed state to the open state.

2. The electronic circuit of claim 1, wherein the controller is further configured, with the solenoid valve in the closed state, to supply the second level of power on the second power node to power the flow detector and pulse transmitter to generate current pulses on the first power node at a rate indicating the fluid flow sensed by the flow meter.

3. The electronic circuit of claim 2, wherein the controller comprises a flow pulse receiver configured to receive on the second power node current pulses generated by the flow detector and pulse transmitter on the first power node and to convert the received current pulses into a corresponding voltage signal having first and second states, the controller configured to determine the fluid flow sensed by the flow meter based on transitions of the voltage signal between the first and second states.

4. The electronic circuit of claim 3, wherein the controller further comprises a solenoid driver including: a first supply voltage node configured to receive a first source voltage; a second supply voltage node configured to receive a second source voltage, the first source voltage being greater than the second source voltage; a switching node coupled to the second supply voltage node; wherein the first switch is coupled between the first supply voltage node and the switching node; wherein the second switch is coupled between the switching node and the second power node; and wherein the controller is configured, in driving the solenoid valve to the open state, to first close the second switch and to thereafter close the first switch for a first time to supply the first level of power on the second power node while the first switch is closed.

5. The electronic circuit of claim 4, wherein the controller is further configured, in maintaining the solenoid valve in the open state, to maintain the second switch closed after the first time to thereby supply the second level of power on the second power node.

6. The electronic circuit of claim 5, wherein the flow pulse receiver further comprises a resistive circuit and wherein the switching node is coupled to the second supply voltage node through the resistive circuit.

7. The electronic circuit of claim 6, wherein the flow pulse receiver further comprises a comparator configured to generate the voltage signal, wherein the comparator generates transitions of the voltage signal between the first and second states based on a voltage generated across the resistive circuit in response to the current pulses received on the second power node.

8. The electronic circuit of claim 1, wherein the inductor is coupled across the first power node and the first reference node, and wherein the flow detector and pulse transmitter further comprises: a switching node; a flow pulse switch coupled between the first reference node and the switching node, and coupled to receive power from the first power node, the flow pulse switch configured to sense a fluid flow sensed by the flow meter and to alternately present a low impedance and a high impedance between the first reference node and the switching node in response to the sensed fluid flow; and a current pulse generator circuit coupled between the first power node and the switching node, the current pulse generator circuit configured to generate, in response to the flow pulse switch presenting a low impedance between the first reference node and the switching node, a current pulse that flows between the first power node and the first reference node through the current pulse generator and the low impedance presented by the flow pulse switch.

9. The electronic circuit of claim 8, wherein the flow meter includes an impeller shaft having a permanent magnet, and wherein the flow pulse switch includes a Hall sensor configured to sense rotation of the permanent magnet of the impeller shaft and to control alternately presenting the high impedance and low impedance between the first reference node and the switching node in response to the sensed rotation of the permanent magnet of the impeller shaft.

10. The electronic circuit of claim 9, wherein the current pulse generator circuit comprises a capacitive circuit and resistive circuit coupled in series between the first power node and the switching node.

11. A circuit, comprising: a flow meter; a fluid flow valve coupled to the flow meter; a flow detector and pulse transmitter coupled to the flow meter and the fluid flow valve and including a first power node and a first reference node, the flow detector and pulse transmitter further configured to generate current pulses on the first power node at a rate indicating a fluid flow sensed by the flow meter; and a controller including a second power node and a second reference node coupled to the first power node and first reference node of the flow detector and pulse transmitter, respectively, the controller configured to detect the current pulses generated by the flow detector and pulse transmitter on the first power node and to calculate the fluid flow sensed by the flow meter based on the rate of the current pulses, and the controller further configured to provide power on the second power node to control the fluid flow valve and to power the flow detector and pulse transmitter; and the controller configured to sense fluid flow detected by the flow meter with the fluid flow valve in both an open state and a closed state, the controller further configured to supply a first level of power on the second power node to drive the fluid flow valve to the open state, and to thereafter supply a second level of power on the second power node, where the second level of power is sufficient to power the flow detector and pulse transmitter and to maintain the fluid flow valve in the open state but is not sufficient to switch the fluid flow valve from the closed state to the open state.

12. The electronic circuit of claim 10, wherein the fluid flow valve comprises a solenoid valve coupled in series with the flow meter between a fluid input and a fluid release mechanism.

13. The electronic circuit of claim 11, wherein the fluid input comprises a water input.

14. The electronic circuit of claim 11, wherein the controller is configured to supply a first level of power on the second power node to drive the solenoid valve to an open state, and to thereafter supply a second level of power on the second power node, where the second level of power is sufficient to power the flow detector and pulse transmitter and to maintain the solenoid valve in the open state but is not sufficient to switch the solenoid valve from a closed state to the open state.

15. A method, comprising: providing a flow detector and pulse transmitter configured to be coupled to a solenoid valve and a flow meter and including a first power node and a first reference node, the flow detector and pulse transmitter further configured to generate current pulses on the first power node at a rate indicating a fluid flow sensed by the flow meter; and providing a controller including a second power node and a second reference node configured to be coupled to the first power node and first reference node of the flow detector and pulse transmitter, respectively; detecting, through the controller, the current pulses generated by the flow detector and pulse transmitter on the first power node; calculating, through the controller, the fluid flow sensed by the flow meter based on the rate of the current pulses; providing, through the controller, power on the second power node to control the solenoid valve and to power the flow detector and pulse transmitter; sensing, through the controller, fluid flow sensed by the flow meter with the solenoid valve in both an open state and a closed state; providing, through the controller, a first level of power on the second power node to drive the solenoid valve to the open state; and providing, through the controller, a second level of power on the second power node where the second level of power is sufficient to power the flow detector and pulse transmitter and to maintain the solenoid valve in the open state but is not sufficient to switch the solenoid valve from the closed state to the open state.

16. The method of claim 15 further comprising coupling a pair of wires between the first power node and first reference node of the flow detector and pulse transmitter and the second power node and a second reference node of the controller.

17. The method of claim 15 further comprising providing, with the solenoid valve in the closed state, the second level of power over the pair of wires for use by the flow detector and pulse transmitter in generating the current pulses on the pair of wires.

\* \* \* \* \*